US012596570B2

(12) United States Patent
Dain et al.

(10) Patent No.: US 12,596,570 B2
(45) Date of Patent: Apr. 7, 2026

(54) OPTIMIZED STORAGE CACHING FOR COMPUTER CLUSTERS USING METADATA

(71) Applicant: INTERNATIONAL BUSINESS MACHINES CORPORATION, Armonk, NY (US)

(72) Inventors: Joseph W. Dain, Tucson, AZ (US); Simon Lorenz, Biebertal (DE); Piyush Chaudhary, Highland, NY (US); Gero Friedrich Wolf Schmidt, Mainz (DE); Qais Noorshams, Frankfurt (DE); Gregory T. Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 17/807,145

(22) Filed: Jun. 16, 2022

(65) Prior Publication Data

US 2023/0409384 A1     Dec. 21, 2023

(51) Int. Cl.
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | |
|---|---|---|---|
| 9,158,540 B1 | 10/2015 | Tzelnic | |
| 9,442,954 B2 | 9/2016 | Guha | |
| 9,456,049 B2 | 9/2016 | Soundararajan | |
| 10,467,569 B2 | 11/2019 | Voss | |
| 10,846,752 B2 | 11/2020 | Tsai | |
| 11,175,950 B1 | 11/2021 | Yang | |
| 2016/0246655 A1* | 8/2016 | Kimmel | G06F 9/5088 |
| 2017/0262896 A1 | 9/2017 | Tsai | |
| 2018/0253219 A1* | 9/2018 | Dotan-Cohen | G06F 3/04847 |
| 2019/0303200 A1 | 10/2019 | Sitaraman | |
| 2019/0392353 A1* | 12/2019 | Liu | G06N 3/08 |
| 2021/0257052 A1 | 8/2021 | Van Rooyen | |
| 2021/0357155 A1* | 11/2021 | You | G06F 3/0659 |

(Continued)

OTHER PUBLICATIONS

Carstens, "High Performance Co-operative Cluster Computing Through Migration of Jobs or Computing Nodes," IP.com, IP.com No. IPCOM000212445D, IP.com Publication Date: Nov. 14, 2011, 8 pages.

(Continued)

*Primary Examiner* — Wynuel S Aquino
(74) *Attorney, Agent, or Firm* — Lily Neff

(57) ABSTRACT

A method, computer system, and a computer program for managing computer jobs in a queue is provided. This comprises extracting metadata from a new job received for processing and upon determining when a similar enriched metadata exists in a database. A job score and storage footprint may then be determined for the new job from the extracted metadata. It is then determined whether the new job can be grouped for processing with any other jobs already placed on a queue. The new job is then added to the queue based on the new job's score and footprint, and whether it can be grouped with other jobs. The queue is then updated and sent to a scheduler for further processing.

19 Claims, 12 Drawing Sheets

(56)           References Cited

U.S. PATENT DOCUMENTS

| | | | |
|---|---|---|---|
| 2022/0083271 A1* | 3/2022 | Cho ...................... | G06F 3/0604 |
| 2022/0179585 A1* | 6/2022 | Muthiah ............... | G06F 3/0673 |
| 2023/0236759 A1* | 7/2023 | Lathrop ................. | G06F 3/067 |
| | | | 711/147 |

OTHER PUBLICATIONS

Disclosed Anonymously, "Method for Cache Replication During Swap Node Addition with Improved Application Performance in the Storage System," IP.com, IP.com No. IPCOM000267474D, IP.com Publication Date: Oct. 29, 2021, 11 pages.

Disclosed Anonymously, "Method to Improve Application Performance in the Storage Subsystems with Improved Deduplication Metadata Management," IP.com No. IPCOM000267629D, IP.com Publication Date: Nov. 11, 2021, 10 pages.

Helland, "Cosmos—Big Data and Big Challenges," Microsoft, Jul. 2011, https://www.microsoft.com/en-us/research/wp-content/uploads/2016/02/en-us-events-fs2011-helland_cosmos_big_data_and_big_challenges.pdf, 27 pages.

Lorenz et al., "Data Accelerator for AI and Analytics," Redbooks, Jan. 2021, https://www.redbooks.ibm.com/redpapers/pdfs/redp5623.pdf, 88 pages.

Mell et al., "The NIST Definition of Cloud Computing", National Institute of Standards and Technology, Special Publication 800-145, Sep. 2011, 7 pages.

Ren et al., "Scaling File System Metadata Performance With Stateless Caching and Bulk Insertion," Parallel Data aboratory, Carnegie Mellon University, CMU-PDL-14-103, May 2014, 22 pages.

Zhu et al, "HBA: Distributed Metadata Management for Large Cluster-Based Storage Systems," IEEE Transactions on Parallel and Distributed Systems, vol. 19, No. 4, Apr. 2008, 14 pages.

IBM, "IBM Spectrum LSF Data Manager," IBM.com, Last Updated: Feb. 7, 2022, https://www.ibm.com/docs/en/spectrum-lsf/10.1.0?topic=lsf-data-manager, 2 pages.

* cited by examiner

100

200

301
Admin.

303
Data Scientists and others

303
Data Scientists

| Job Input Queue | Computer Cluster | Metadata Catalog |

500

* Calculate job scoring and predicted cache (metadata)
* Job Queue with Scoring
* Grouper – group and order new archive request to queue
* Sorted queue with grouped jobs
* Schedule Manager – provide updated queue to Scheduler

| Scheduler 310 | | | |
|---|---|---|---|
| prefetch | Transfer executor | Job group executor | evict |

Admin.

301

Computer
High Performance storage direct attached to compute
302

WAN

Very large storage with unpredictable network connection

| Warm | Cold | Cold archive |

FIG. 5

OPTIMIZED STORAGE CACHING FOR COMPUTER CLUSTERS USING METADATA

BACKGROUNDS

The present invention relates generally to the field of data management and more particularly to techniques for storage caching optimization in computer clusters using metadata information.

Modern technology increasingly depends on collection and processing of large amount of data. Large data processing may be crucial in many fields such as Artificial Intelligence (AI) to statistical analysis. Large amount of data may be stored in huge "data lakes" that make data storage and manipulation challenging. In addition, storage of large amount of data may be difficult and expensive. Furthermore, speed and efficiency of processes needs to be maintained despite storage costs and difficulty.

Many processes that depend on large amount data also require repeatedly running analytics on the data. Because of the cost and challenges associated with storage, data may be categorized in different storage classes. (e.g. object, disk, tape) and even in different storage (capacity) tiers. This allows data to be disposed in different storage locations depending on its use requirements. When data manipulation requirements may be immediate for a given job, data may be moved into a high-performance cache tier which may be located closer to the compute nodes. Unfortunately, the size of the high-performance cache tier may be limited due to cost and logistics, and small compared to the size of the overall data lake by nature. An efficient use of the limited capacity in the cache tier may be key, but prior art does not provide many solutions.

Therefore, a need exists for a techniques that enhance efficient use and of data storage connected to scheduling of data-intensive compute jobs by leveraging decorated/enriched metadata information.

SUMMARY

Embodiments of the present invention disclose a method, computer system, and a computer program for managing computer jobs in a queue. In one embodiment, this comprises extracting metadata from the new job received for processing and determining when a similar enriched metadata exists in a database. A job score may then be determined for the new job using the extracted metadata and any existing enriched metadata. The storage footprint of the new job may also be determined from the extracted metadata. It may then be determined whether the new job can be grouped and labelled similarly for processing, with any other jobs already placed on a queue. The new job may then be added to the queue and the queue sorted. The placement of the new job on the queue may be based on a combination of the new job's score and storage footprint, and the new job's grouping with other jobs already placed on the queue for processing. In one embodiment, the updated sorted queue may be sent to a scheduler for further processing.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings may be not to scale as the illustrations may be for clarity in facilitating one skilled in the art in understanding the invention in conjunction with the detailed description. In the drawings:

FIG. 5 illustrates a block diagram of architecture provided for processing jobs according to at least one embodiment;

DETAILED DESCRIPTION

Figure 1:
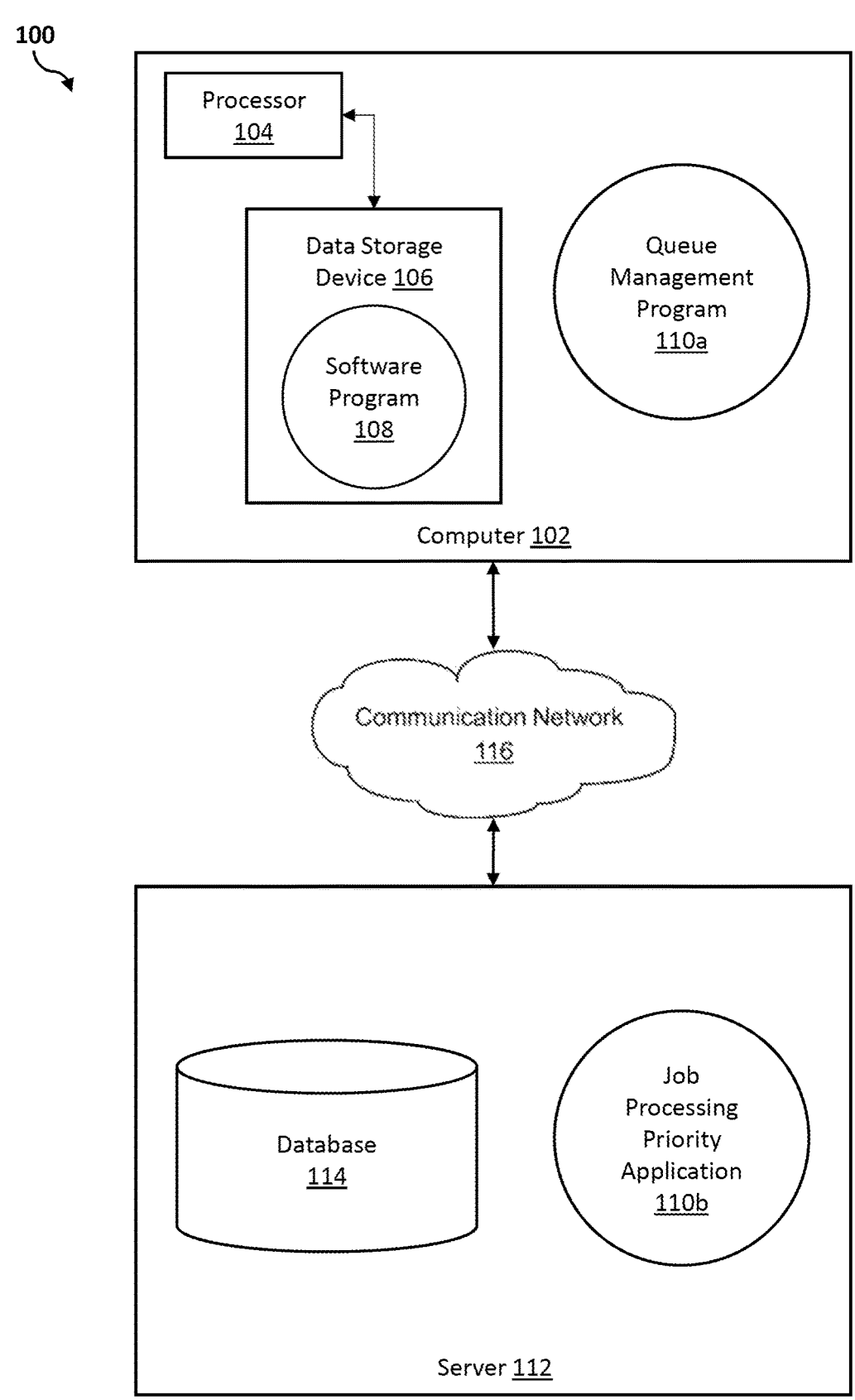
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but may not be limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for managing computer jobs in a queue. This comprises extracting metadata from a new job received for processing. In one embodiment, a database is also searched to determine if a similarly labelled metadata was stored previously that will improve the speed and accuracy of the current request. A job score may then be determined for the new job using the extracted metadata. The storage footprint of the new job may also be determined from the extracted metadata. It may also be determined whether the new job can be grouped for processing with any other jobs already placed on a queue. The new job may then be added to the queue and the queue sorted. The placement of the new job on the queue may be based on a combination of the new job's score and storage footprint, and the new job's grouping with other jobs already placed on the queue for processing. In one embodiment, the updated sorted queue may be sent to a scheduler for further processing.

FIG. 1 provides an exemplary networked computer environment 100 in accordance with one embodiment. The networked computer environment 100 may include a computer 102 with a processor 104 and a data storage device 106, enabled to run a software program 108 and a queue management program 110a. The networked computer environment 100 may also include a server 112, enabled to run a job processing priority application 110b that may interact with a database 114 and a communication network 116. The networked computer environment 100 may include a plurality of computers 102 and servers 112, only one of which has been shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 8, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as an exclusive cloud, community cloud, public cloud, or hybrid cloud. Client computer 102 may be, for example, a mobile device, a telephone, a customized digital assistant, a netbook, a laptop computer, a tablet computer, a desktop computer, or any type of computing devices capable of running a program, accessing a network, and accessing a database 114. According to various implementations of the present embodiment, queue management program 110a, and a job processing priority application 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the program/application 110a, 110b (respectively) to provide a task management technique. This technique will be provided in more detail below with respect to FIGS. 2 through 7. The present system according to one embodiment, as provided in FIG. 2 uses a technique that exploits annotated data (e.g. based on labels) to enhance scheduling of data-intensive compute jobs by leveraging decorated/enriched metadata information. This also optimizes cache utilization leading to higher jobs throughput and system utilization. This requires arranging things in a technique as provided in FIG. 4 and FIG. 5.

Figure 2:
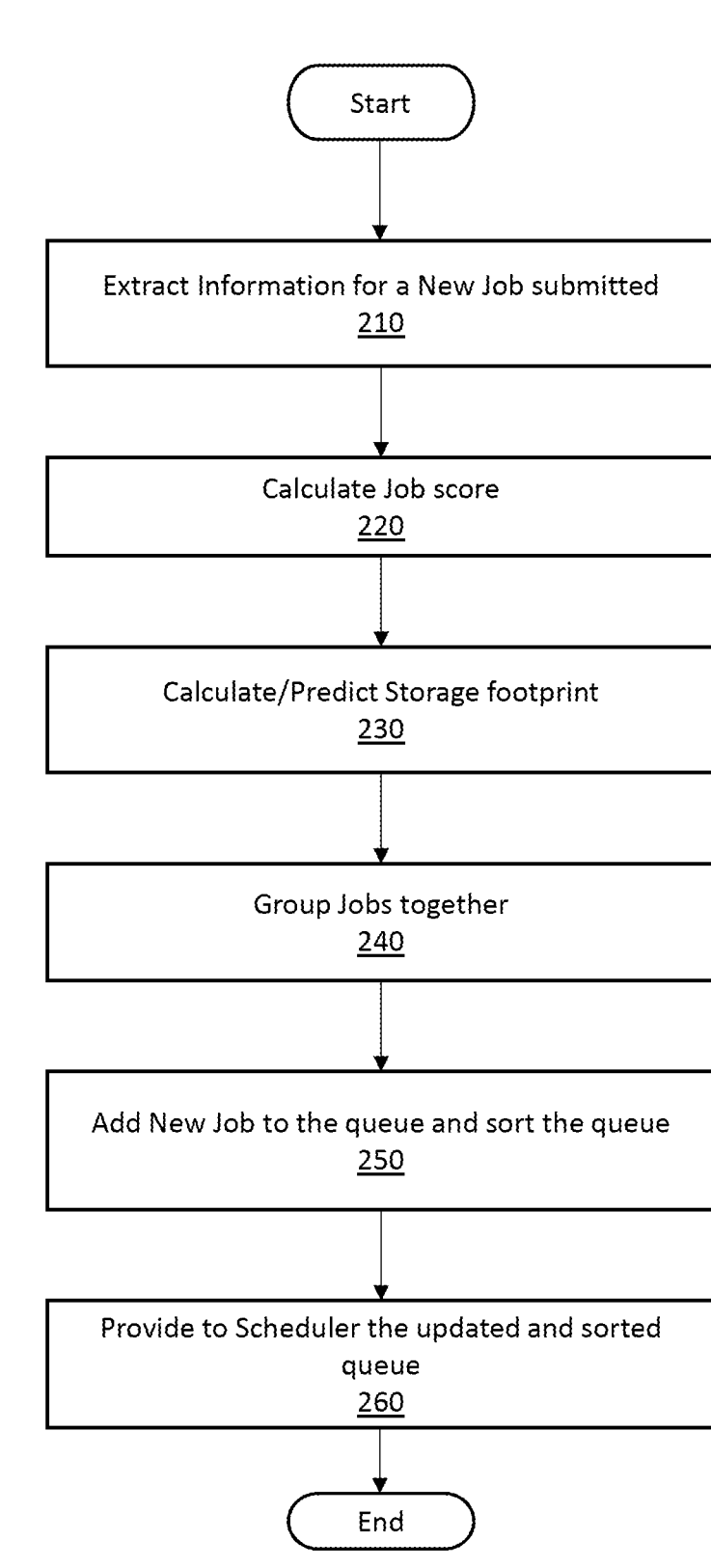
FIG. 2 provides a flowchart illustration of a method according to one embodiment.

FIG. 2 provides a flowchart illustration of one embodiment for managing computer jobs in a queue. Numeral 200 in FIG. 2 provides the process of managing the queue and the techniques associated with it.

In Step 210, the metadata of a new job received for processing may be extracted. The new job may be requested for processing by a single user, a plurality of users or an automated device (AI etc.). It may also involve a number of execution requests within the single job sent for processing.

In one embodiment, there may be a distinct job input queue associated with information received from this new job. In that case, the information may also be extracted from the metadata catalog (to be provided). The latter may be stored as a previous job and so the similar metadata can be used to speed the processing time or to fill in extra details as needed. Depending on the embodiment and the architecture, different storage tiers and processing components (including cache tiers) may also be provided in association with one or more networking clusters. In one embodiment, a databased may be researched for any existing enriched metadata that has been labeled and categorized similarly to the existing metadata that was currently extracted.

In Step 220, the extracted metadata may be then used for calculating a score for the new job received. A plurality of factors may be examined for calculating the job score. Some of these factors may be examined in more details in conjunction with FIGS. 6a and 6b. For example, in one embodiment, the job score may be determined from at least one of a job priority, previous job completion record, and/or job complexity of the job. Previous job execution or similar jobs (from prior history) may also be analyzed and taken into consideration.

In Step 230, the extracted metadata may be also used for calculating and predicting the storage footprint, including the cache footprint associated with the new job. The requirement of storage may be determined by requirements of speed associated with the newly requested job. Amount of data or the nature of the data may also be considered in this calculation. In one embodiment, an analysis may be made to determine whether the job requires using a high-performance cache tier. Such requirement may necessitate moving the data closer to one or more compute nodes. As discussed earlier, some of these considerations may be specific to the nature of the architecture or cost constraints. The latter can have an impact on the size of the high-performance cache tier and the number of jobs on the queue that require access to it and which need to be scheduled accordingly.

In Step 240, a job processing queue associated with the new job may be identified. The entries and the type of jobs already on this queue will then be analyzed. One determination to be made may be whether the new job can be grouped and processed with any of the other jobs already disposed on this queue. In one embodiment, the entire queue may be examined to see if any of the jobs, (including the new job), that are not already associated can be grouped together for further processing. In one embodiment, as will be further discussed in conjunction with FIGS. 4-7, a grouper may be used to assist in this job groupings. In one embodiment, certain other specific factors may also be considered when grouping jobs together. For example, job prefetch and eviction needs for all pending jobs may be considered. Some more details about this concept will be provided in conjunction with FIG. 7 and FIG. 8. One objective of such grouping beyond cost and speed considerations, may be to ensure the efficiency of using the cache.

In step 250, the new job may be then added to the queue. The placement of the new job on the queue may be based on a combination of the new job's score and storage footprint, and the new job's grouping with other jobs already placed on the queue for processing. This leads to an efficient use/reuse of the cache. In one embodiment, every time a job completes, the queue may be examined and resorted if requirements that led to grouping changes.

Once the job groups have been completed and placement of the new job has been made, the queue may then be sorted. In one embodiment, as shown in Step 260, the sorted queue may be then updated and sent to a scheduler for further processing. In one embodiment, a Schedule Manager will then provide the result of this updated sorted queue to a Scheduler for further processing. Whenever a job finishes or any job requirements change such that an update may be required to the queue, the Scheduler Manager provides such updated and provide the updated queue to the Scheduler for appropriate changes in processing.

Figure 3:
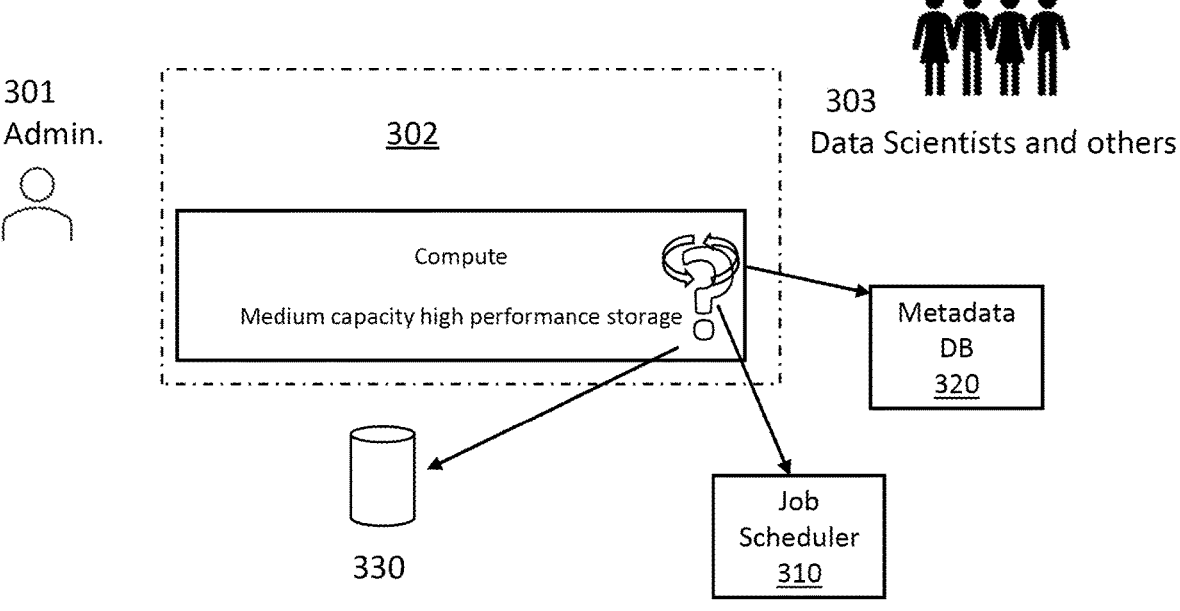
FIG. 3 provides a block diagram showing a plurality of job requests received for processing.

FIGS. 3-8 provide an example of how some of the processes discussed in FIG. 2 may be further accomplished according to one or more embodiments. The process may commence with job requests as illustrated in FIG. 3.

In FIG. 3, a system having a plurality of users 303 of different skills and needs may be providing job requests to the system. In this scenario, some of the users may be data scientists 330 and even automated systems (in an AI environment) with complex data processing needs. In this scenario, a system administrator 301, who could be an automated component or a person, may be associated with the responsibility of managing job request processing. The jobs may be scheduled for processing on a job scheduler 310. Some Metadata 320 may be associated with each job. The overall data may be stored in "data lakes", which may be one or more storage tiers and locations. Due to cost and efficiency constraints and necessities, scheduling jobs have to be made with considering priority and processing speed considerations. Consequently, as shown at 302, a plurality of decisions has to be made such as how to schedule and complete computing jobs in an efficient manner. The size of the high-performance cache 330 tier may be limited and small compared to the size of the overall data lake by nature. Therefore, any decision regarding job performance and scheduling has to be made with analyzing the constraints of cache 330 and number of jobs that require access to it that may be disposed on one or more queues. In general, as illustrated from FIG. 3, medium capacity high performance storage may be attached to some data. Therefore, a decision needs to be made as whether this will suffice of the job has to be moved for processing to the high-performance storage 330.

Due to their size, large "data lakes" cannot be disposed entirely closely to Compute nodes because of logistics and cost of general storage. While local nodes have limited system memory, fast memory may be expensive. But to perform fast and efficient processing data needs to be brought closer (usually via, e.g., other memory such as cache) to reduce analytic times and get to results faster. Still costs of high performing storage may be high and affect the overall architecture designs. This may be especially true in artificial intelligence (AI) projects.

Large Scale AI systems may be used by many users, including multiple data scientists with extensive data processing needs and complex automated system. This causes a resource competition and therefore the problem of which data can be presented to the cache, and at which time becomes a real challenge for the designers of these systems. A related issue, may be the eviction of data at different times, based on some form of priority so as to free up high performing expensive storage space. In addition, users need the ability to request "data" based on labels to classify the contents of the data (e.g., objects in an image) through enriched/decorated metadata rather than a selection based only on system metadata (e.g., file/object name, location, size).

In a different scenario, input data can be staged from an external source storage repository to a cache that may be accessible to the cluster execution hosts. However, output data may be staged asynchronously (dependency-free) from the cache after job completion. Data transfers run separately from the job allocation, which means more jobs can request data without consuming resources while they wait for large data transfers. Remote execution cluster selection and cluster affinity may be based on data availability. In such a case, data managers transfer the required data to the cluster that the job was forwarded. In one embodiment, the data manager allows to create data transfer jobs that start as a prerequisite for scheduled analytic jobs. Metadata and cross job execution may not be considered, so that the same data staged also gets de-staged once the analytic job may be finished.

Figure 4:
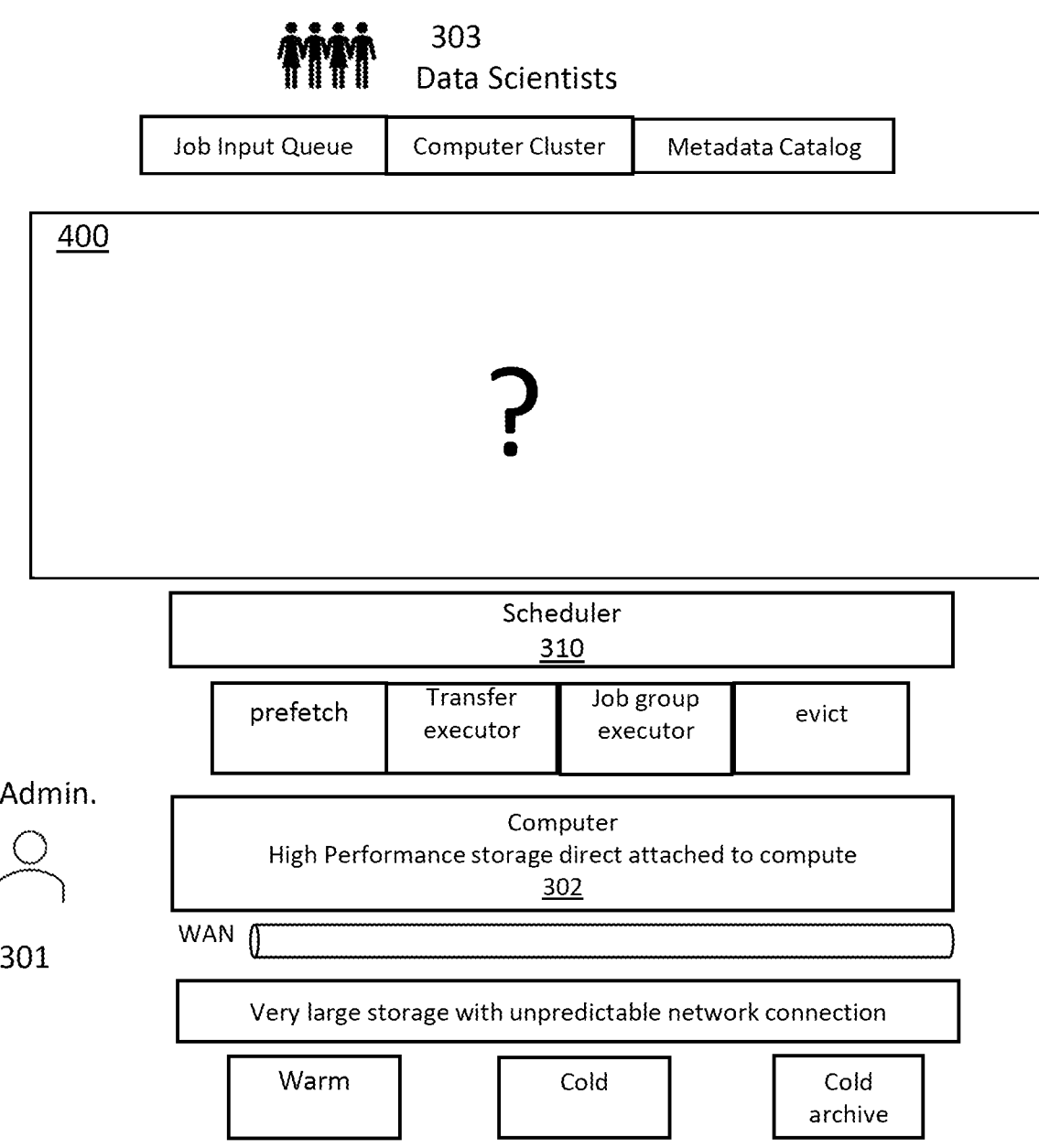
FIG. 4 provides a block diagram of components necessary for processing job requests such as the one provided in conjunction with FIG. 3.

The process then proceeds to FIG. 4, after the user(s) 303 have already provided one or more job requests for processing. In one embodiment, data inputs may be associated with these requests and lead to an original job input queue. Information can then be extracted from the metadata catalog provided with such job requests so as to be provided for computing to a networking cluster. In one embodiment, the cluster may have a plurality of different tier storage and processing components. The system must then analyze this information to denote how (denoted by 400 "?") the data and storage can be manipulated to provide the fastest and most efficient and cost effective way to use the available storage. This will improve on methods that allow the workloads to be handled without 500. In the latter cases, the job is immediately received and handled by the Scheduler 310 with ultimately provides an inefficient outcome.

FIG. 5 provides an illustration of this process after the analysis has been completed. The reference numeral 400 that denoted an incomplete analysis determination in FIG. 4 has been replaced with block 500 in FIG. 5. According to one embodiment, the block 500 utilizes information such as the user input for starting an entry in the job queue, and extracts current metadata of the data worked with and obtains cluster computer information to orchestrate a job and data priority. In one embodiment, the existence of any enriched and similarly labelled metadata is determined. This information is then provided and used to (using a scorer) calculate job scoring and predicted storage footprint based on metadata so that the job queue can be updated with the scoring input. The grouper can be also used to group and order new active job request to queue on cache reuse efficiency. The queue will then be sorted with these grouped jobs (prefetch, evict, grouped compute jobs). A Schedule Manager will then provide the result of this—mainly the sorted and grouped output queue to Scheduler 310 as shown.

Figure 6A:
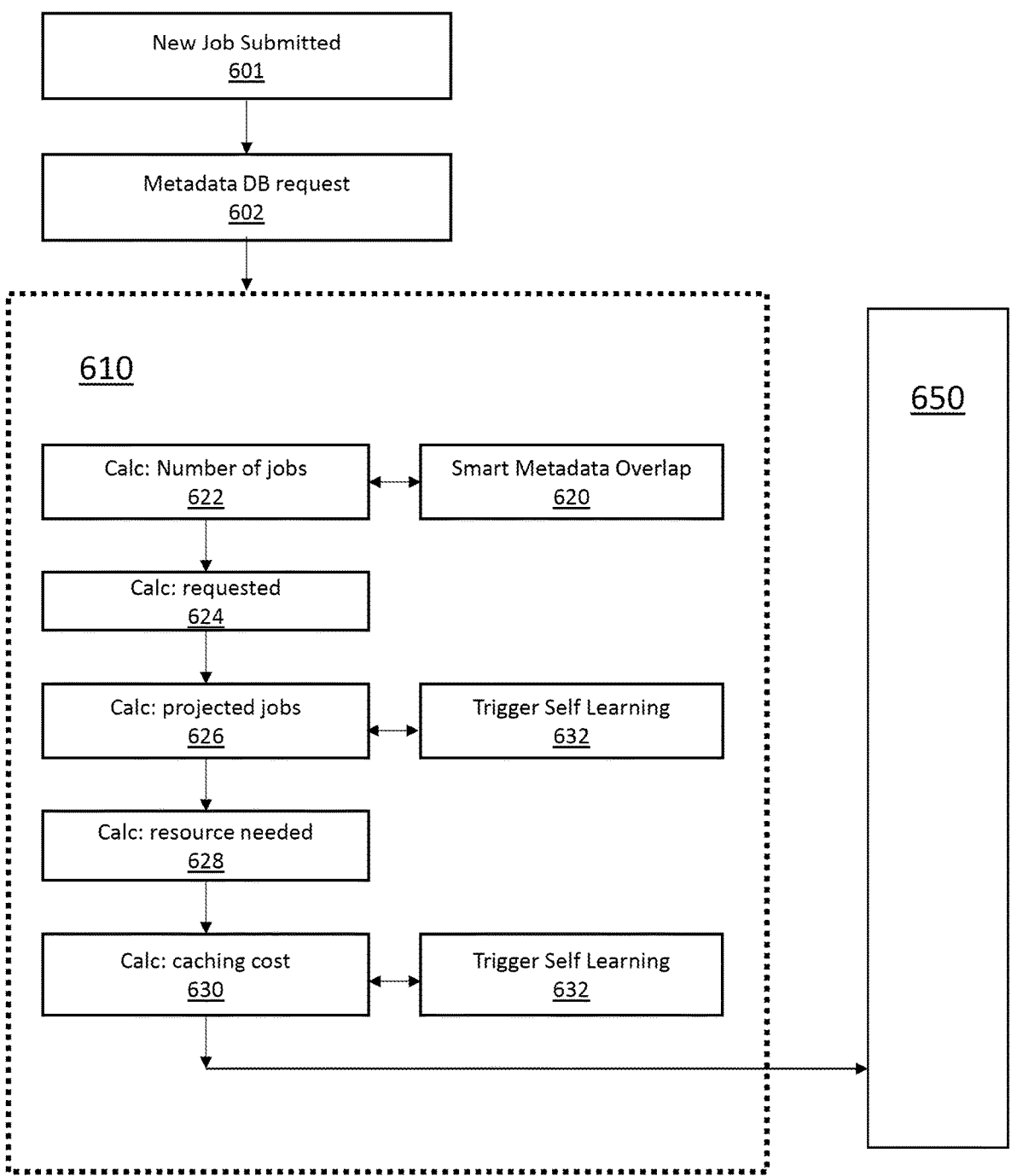
FIG. 6a provides a block diagram of a Flow Sorter according to one embodiment.
Figure 6B:
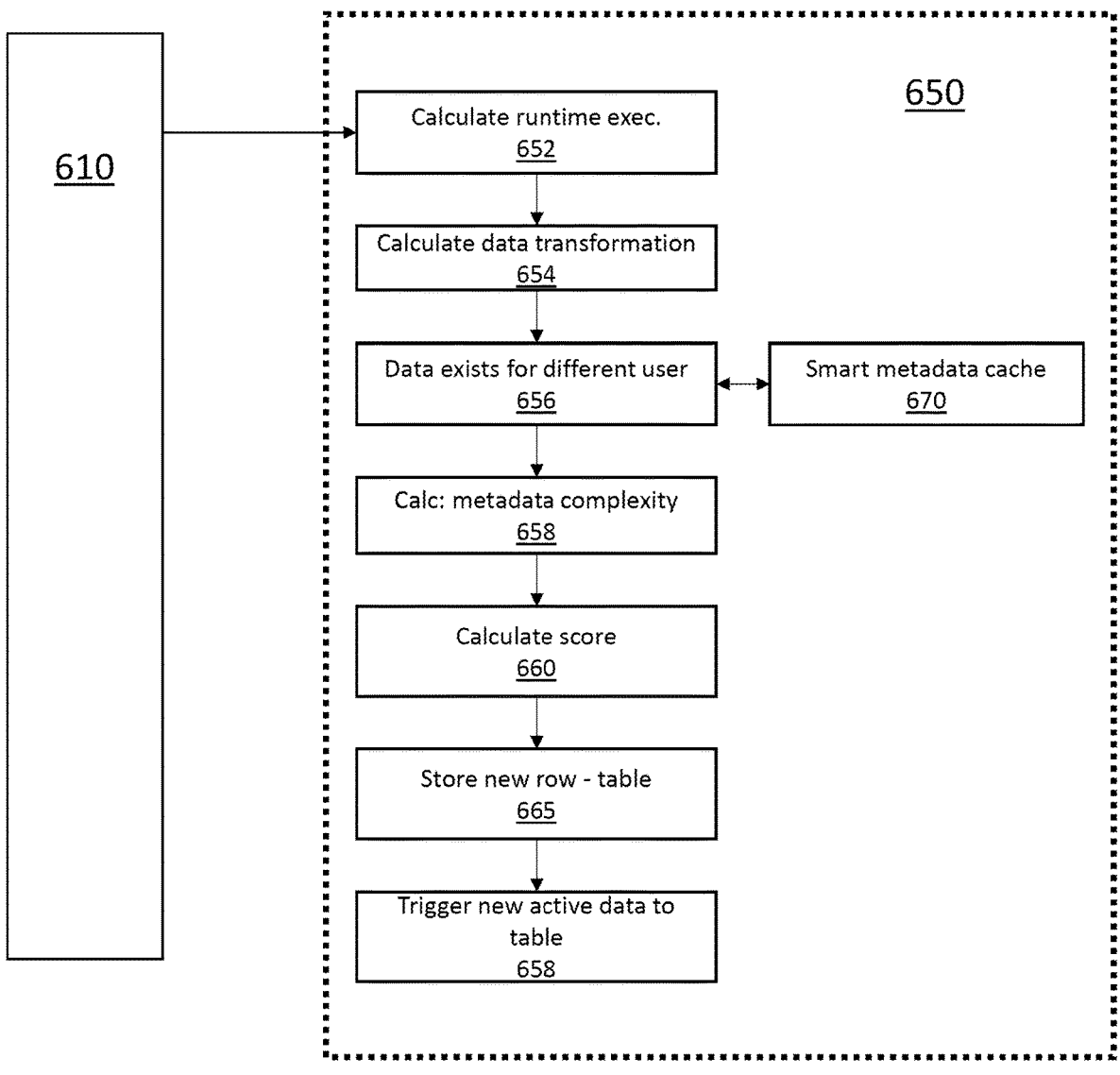
FIG. 6b provides some of the functions necessary for the Flow Sorter according to embodiment of FIG. 6b.

FIGS. 6a and 6b provide the score calculation process that ultimately will place the job in an order of priority in the job performance queue as was discussed in FIG. 2. The diagram of FIGS. 6a and 6b provide for a detailed look of a flow sorter. To provide some ease of understanding, an example can be used. In this example two jobs may be provided for processing. A first job—JOB #123—needs and processes a variety of objects including cars, pedestrians, traffic lights, trees, bicycles, fog, and daytime conditions. The second job being processed—JOB #124—has needs and processes cars, trucks, pedestrians, traffic lights, trees, bicycles, fog, and daytime conditions. While there may be some common components in the two jobs, there may be also dis-similarities.

The metadata may include key value pairs and previous or other job requests. It may also have requirements such as resources that may be needed to complete the job. Job priorities may be also a factor for determination (also process priority control—if that service may be provided).

The list of data provided may also include locations in one embodiment. Other noteworthy requests or considerations may be whether access may be direct, as a stream or caching and one on one (direct access versus cache access).

In this example, both jobs may be submitted, and the metadata information may be requested and extracted from the database (Steps 601 and 602 respectively). The process than can be divided into two parts. The first part shown in FIG. 6a, deals with the calculation and prioritization which is shown as box 610.

In Step 620, the keys that may be provided by the metadata extraction and detection provide an amount of percentage of overlap. In the example above there may be only one addition in JOB #124—the addition of trucks. Therefore, a large percentage of the two jobs may be similar. As seen in Step 622, there may be also an assessment of how many other jobs might have requested this type of data by percentage. This will lead to a calculation of weight—by prior history in Step 624 and an ultimate projected calculation of the job runtime (based on weight etc.). When this may be handled by an AI system, the process may also trigger a self-learning step (Step 630). This in turn will lead to other calculations including the number of resources needed (Step 626) which can include but may not be limited to looking at resource needs such as general processing units (GPUs), nodes, storage and others based on data size and complexity. In Step 628 cost or such resources may be also taken into consideration. For example, caching cost (small versus large files), networking cost, distance from the resources and other similar considerations may be taken into the overall calculations. Once this process completes, another self-learning step (Step 632) may be instigated to provide the calculations made with the additional information. Once these calculations have been provided, the second part of the process commences as shown in more detail in FIG. 6b (enumerated as block 650).

FIG. 6b illustrates (Step 650) how calculations may be made as pertaining to the execution of the process. In Step 652 the runtime execution framework costs may be calculated (also costs associated with the resources needed, costs to start the process etc.). In Steps 654 and 656 respectively, the amount of data transformation needed and the existence or lack of data pertaining to different users may be then determined. At this stage, the process can involve (either AI or system process) obtaining and analyzing historical/prior information. The latter may be other historical user requests so as to help predictability of needs or about the success of a similar job completion (this is shown in Step 670). Links to same data might exist or be created at this point for future ease of execution and data retention. The metadata complexity may be also taken into consideration (for example, how many different classes may be obtained etc.) as shown in Step 658.

In Step 660 the overall score may be calculated. In one embodiment, the information obtained (as weights for example) in Steps 620-628 and 652-656 may be combined to obtain the score in Step 660. In Step 665, this score may be stored as a new row in the active data request (queue) table. The latter may trigger a new active data request to be added to the table flow as shown in Step 668.

Figure 7A:
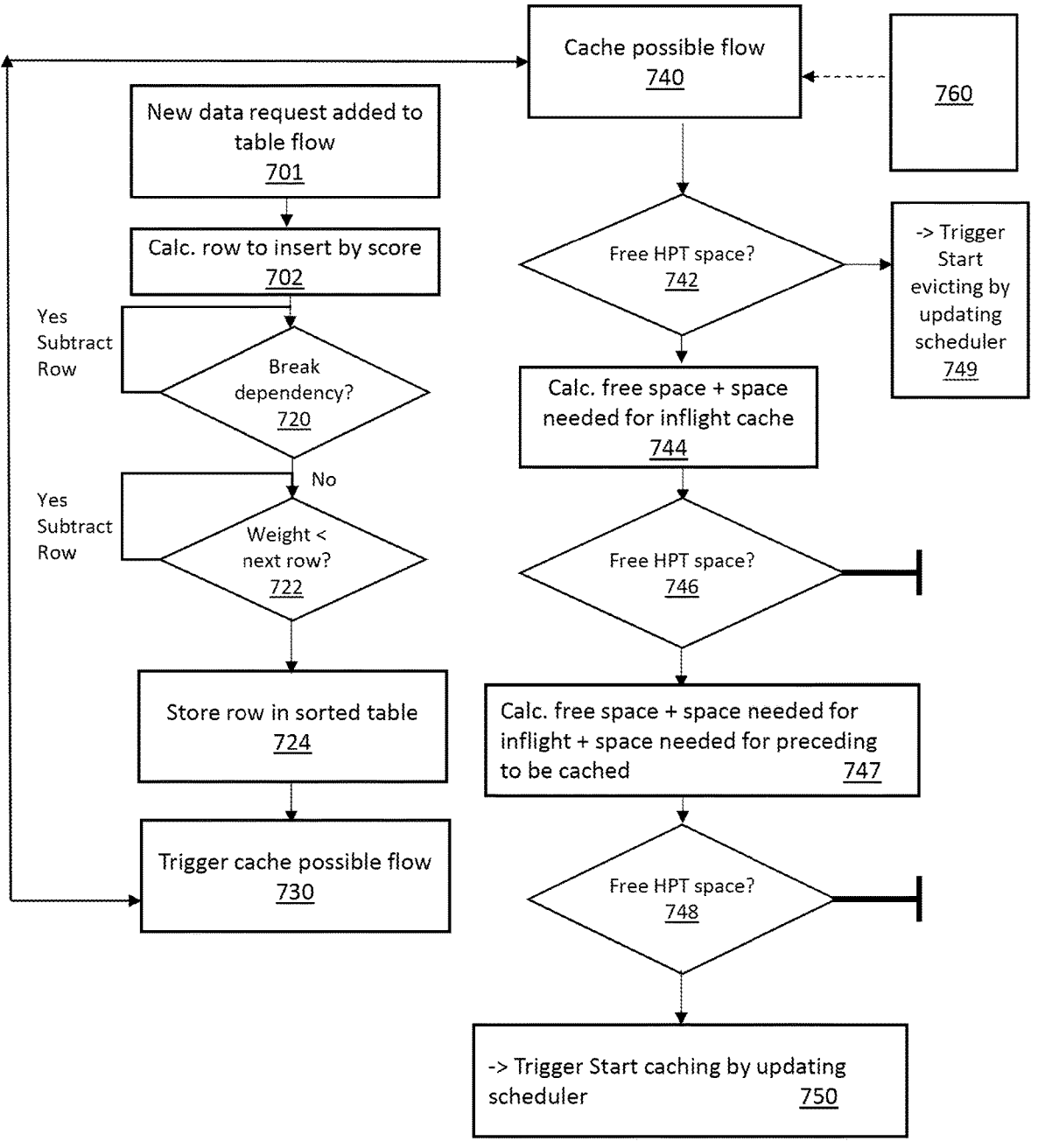
FIG. 7a provides a flowchart depiction of a loopback option according to one embodiment.
Figure 7B:
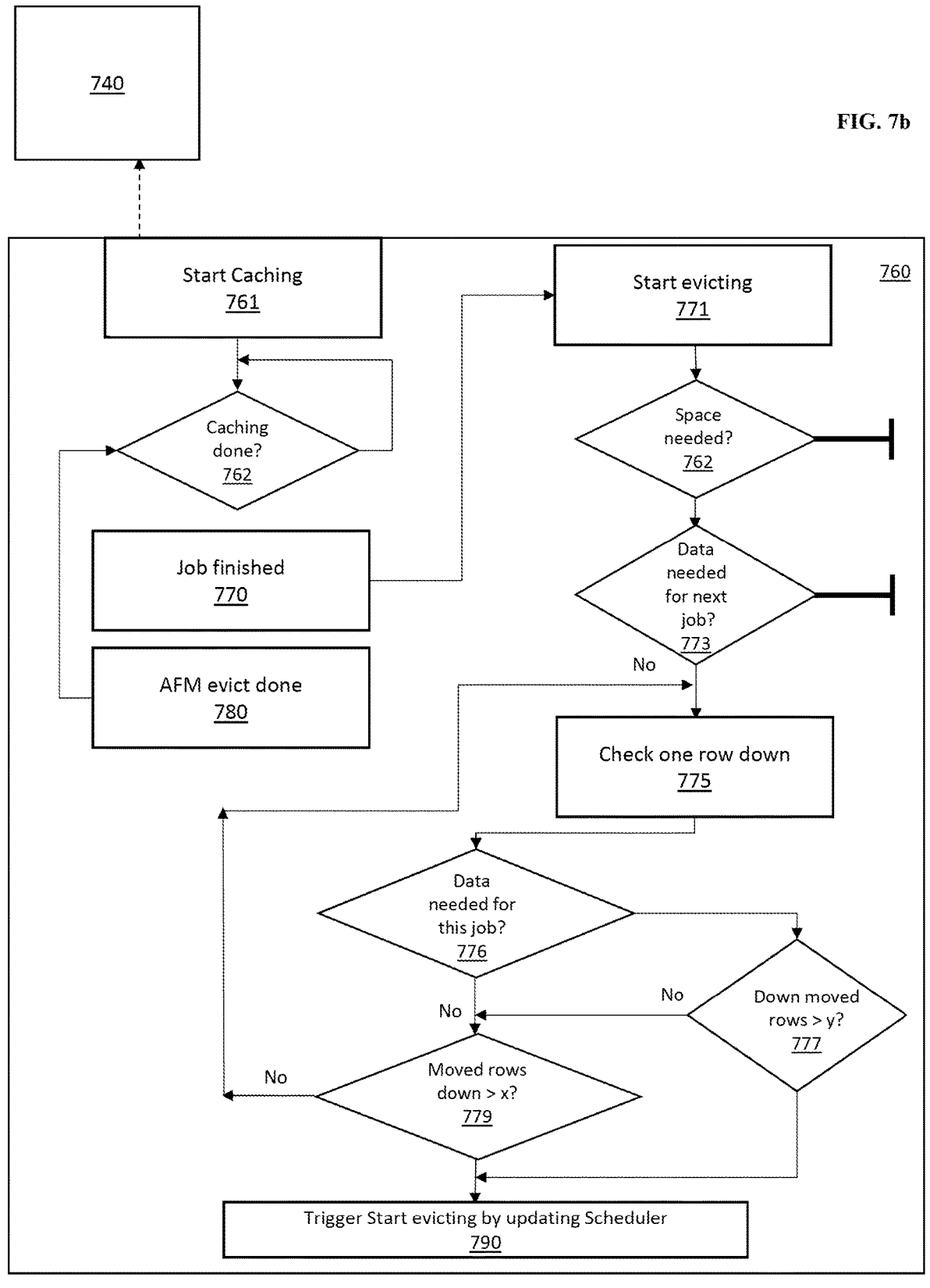
FIG. 7b provides a flowchart illustration of a flow grouper as a component that will be provided to the loopback option flow of FIG. 7, according to one embodiment.

FIG. 7a provides a loopback option. FIG. 7b provides a portion of a process that may or may not be required for completion by FIG. 7a. This is why there is a dotted arrow that goes from FIG. 7a to FIG. 7b. In other alternate embodiments, FIG. 7b can be also performed separately.

The Loopback shown in FIG. 7a provides a flow grouper with an output that may be provided to the scheduler. FIG.

7a commences where FIGS. 6a and 6b ended in which the new active data request may be added to the table flow and the calculated row has been inserted by the score (Steps 701 and 702 as shown). The addition of the row may be then examined to see if it will break any dependencies in decision Step 720 and/or if the job request's calculated weight may be less than of the next row (less priority) as shown in decision Step 722. If the response may be affirmative in each case, then the row will be subtracted from the queue order. Otherwise as shown in Step 724, the new row may be stored and sorted in the active data or the request table (which may trigger a cache possible flow as shown in FIG. 730).

Once the priority has been established, there needs to be a determination of whether more space may be needed. This determination may be provided in steps 7401742. If more space may be needed as provided in Step 744, a calculation may be made as how to much more space may be needed. If there may be no space requirement, the Scheduler will be updated in Step 750.

However, if additional space may be needed, the need will be calculated, and additional space may be freed-up (Step 744). In Step 746 the overall space may be again examined and if the freed-up space may be not adequate, the step(s) may be reiterated in Step 747 and Step 748 until the process may be completed and the Scheduler can be updated as shown in Step 750. Step 749 is provided when there is a determination that no additional space is needed. In such a case, the process returns back to the last performed and executed location.

FIG. 7b as discussed may or may not be needed. However, when it is determined that additional space is needed, at this or other stages as appropriate, the sub-process of FIG. 7b can be performed.

In FIG. 7b, the process starts at Step 760 which indicates storage has to be freed and additional space is needed. The amount of location of additional free space needed is then determined. In this regard, Steps 765-790 provide different options. In Step 765, it may be examined if the caching has been completed or in Step 770, whether the Job has been completed or in Step 840 if some form of data (storage) eviction may be possible. Appropriate steps may be taken accordingly depending on which option, if any, provide a possibility. For example, whenever the Job has been completed (finished) the data may be evicted (if the space may no longer be needed) as in Step 772. This may be especially important if the data/space may be needed for the next job performance as shown in decision block 775. This will allow the rows to be moved down (decision block 779) and the process may be checked (Step 773 and Step 776 and Step 777) until it may be accomplished. In Step 774 when it is determined that the data is needed for the next job (S773), then the functions like auto evict and fetch are checked and it is also determined if the data processing is still being performed (and thus busy).

Once this process may be performed the Scheduler may be updated (Step 790). Of course, this may be only accomplished if the data may be not needed for the next job. In that case, the auto evict and fetch may be used when the data may be needed for the next job (check data busy).

Figure 8:
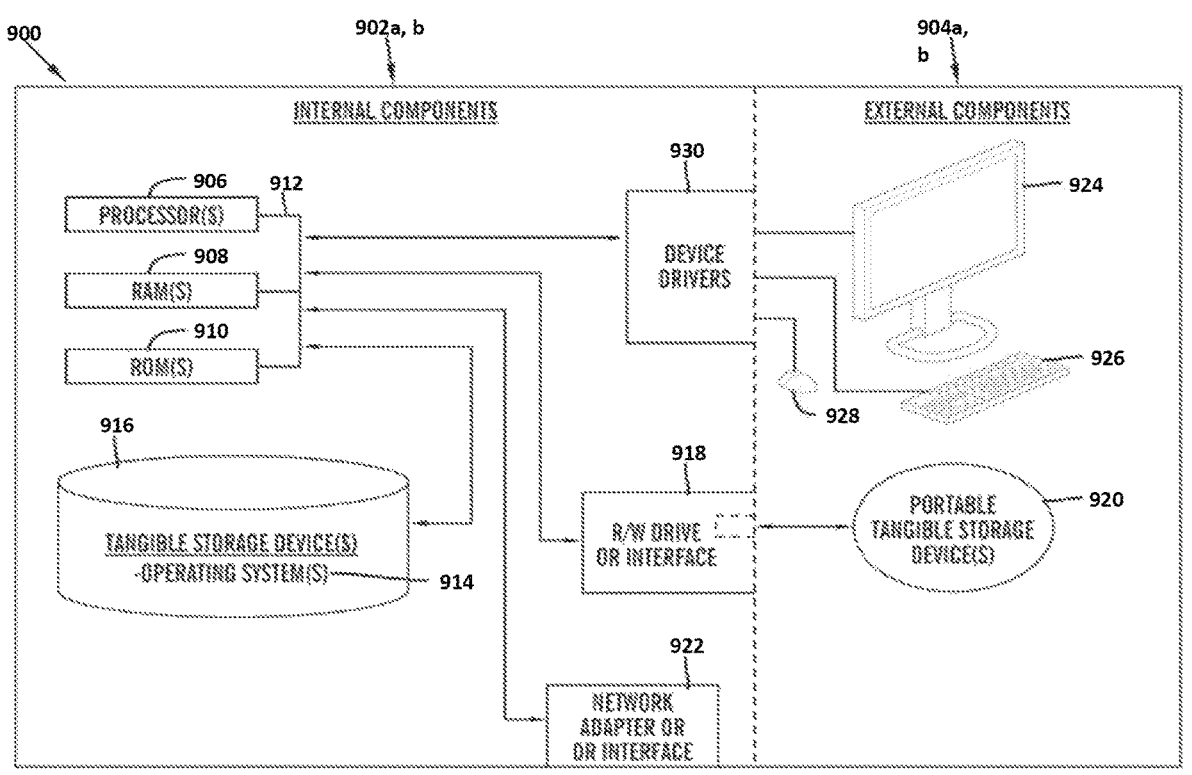
FIG. 8 provides a block diagram of internal and external components of computers and servers depicted in FIG. 1 according to at least one embodiment.

FIG. 8 provides a block diagram 900 of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 902, 904 may be representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but may not be limited to, individual computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 8. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the queue management program 110*a* in client computer 102, and the job processing priority application 110*b* in network server 112, may be stored on one or more computer-readable tangible storage devices 916 for execution by one or more processors 906 via one or more RAMs 908 (which typically include cache memory). In the embodiment illustrated in FIG. 8, each of the computer-readable tangible storage devices 916 may be a magnetic disk storage device of an internal hard drive. Alternatively, each of the computer-readable tangible storage devices 916 may be a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108, the queue management program 110*a* and the job processing priority application 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the queue management program 110*a* in client computer 102 and the job processing priority application 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the queue management program 110*a* in client computer 102 and the job processing priority application 110*b* in network server computer 112 may be loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It should be understood in advance that although this disclosure includes a detailed description on cloud computing, implementation of the teachings recited herein may not be limited to a cloud computing environment. Rather, embodiments of the present invention may be capable of being implemented in conjunction with any other type of computing environment now known or later developed.

Cloud computing provides a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Cloud Model characteristics may be as follows:

a. On-demand self-service: a cloud consumer can unilaterally provision computing capabilities, such as server time and network storage, as needed automatically without requiring human interaction with the service's provider.

b. Broad network access: capabilities may be available over a network and accessed through standard mechanisms that promote use by heterogeneous thin or thick client platforms (e.g., mobile phones, laptops, and PDAs).

c. Resource pooling: the provider's computing resources may be pooled to serve multiple consumers using a multi-tenant model, with different physical and virtual resources dynamically assigned and reassigned according to demand. There may be a sense of location independence in that the consumer generally has no control or knowledge over the exact location of the provided resources but may be able to specify location at a higher level of abstraction (e.g., country, state, or datacenter).

d. Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

e. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Model characteristics may be as follows:

f. Software as a Service (SaaS): the capability provided to the consumer may be such as to use the provider's applications running on a cloud infrastructure. The applications may be accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

g. Platform as a Service (PaaS): the capability provided to the consumer may be to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

h. Infrastructure as a Service (IaaS): the capability provided to the consumer may be to provision processing, storage, networks, and other fundamental computing resources where the consumer may be able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Model characteristics may be as follows:

i. Exclusive cloud: the cloud infrastructure may be operated solely for an organization. It may be managed by the organization or a third party and may exist on-premises or off-premises.

j. Community cloud: the cloud infrastructure may be shared by several organizations and supports a specific community that has shared concerns (e.g., mission, security requirements, policy, and compliance considerations). It may be managed by the organizations or a third party and may exist on-premises or off-premises.

k. Public cloud: the cloud infrastructure may be made available to the general public or a large industry group and may be owned by an organization selling cloud services.

l. Hybrid cloud: the cloud infrastructure may be a composition of two or more clouds (exclusive, community, or public) that remain unique entities but may be bound together by standardized or proprietary technology that enables data and application portability (e.g., cloud bursting for load-balancing between clouds).

A cloud computing environment may be service oriented with a focus on statelessness, low coupling, modularity, and semantic interoperability. At the heart of cloud computing may be an infrastructure comprising a network of interconnected nodes.

Figure 9:
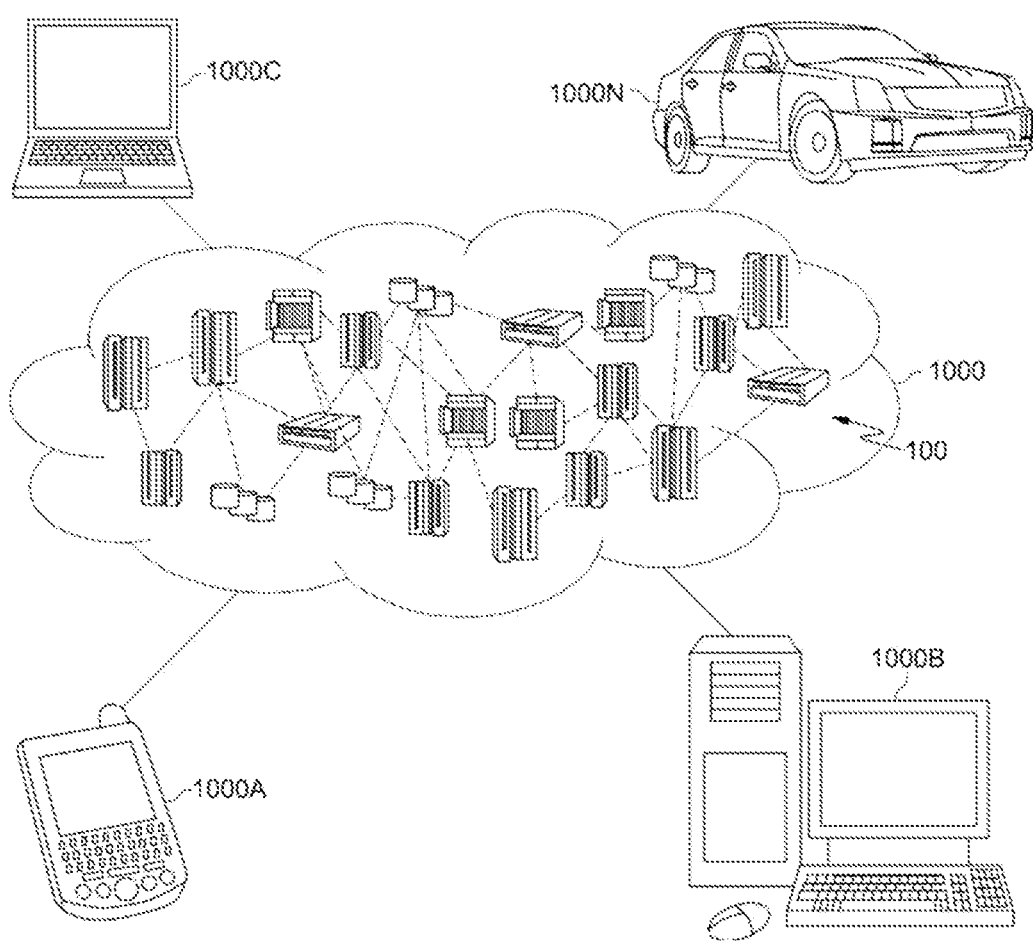
FIG. 9 provides a block diagram of an illustrative cloud computing environment including the computer system depicted in FIG. 1, in accordance with one embodiment.

Referring now to FIG. 9, illustrative cloud computing environment 1000 may be depicted. As shown, cloud computing environment 1000 comprises one or more cloud computing nodes 100 with which local computing devices used by cloud consumers, such as, for example, digital assistants (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as exclusive, Community, Public, or Hybrid clouds as described hereinabove, or a combination thereof. This allows cloud computing environment 1000 to offer infra-structure, platforms and/or software as services for which a cloud consumer does not need to maintain resources on a local computing device. It may be understood that the types of computing devices 1000A-N shown in FIG. 8 may be intended to be illustrative only and that computing nodes 100 and cloud computing environment 1000 can communicate with any type of computerized device over any type of network and/or network addressable connection (e.g., using a web browser).

Figure 10:
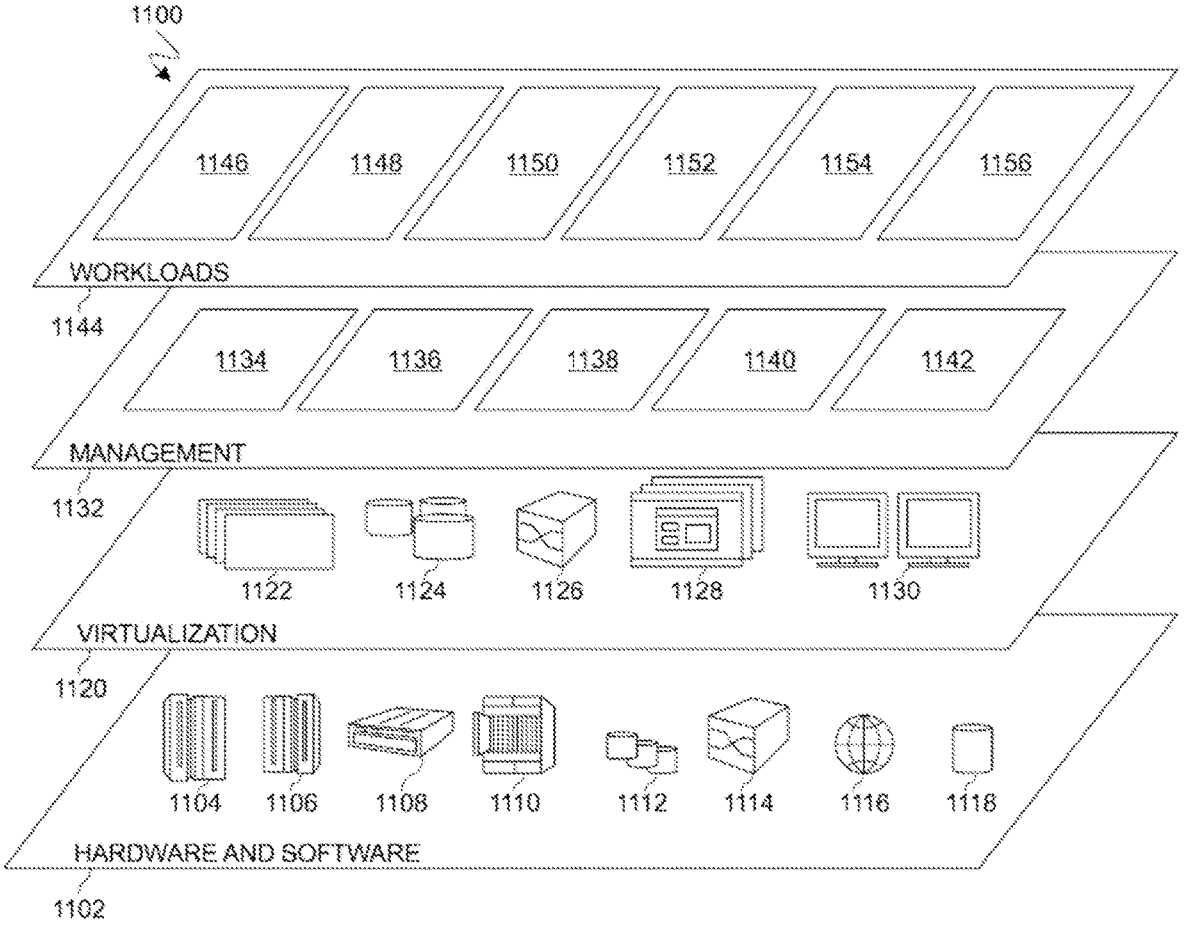
FIG. 10 provides a block diagram of functional layers of the illustrative cloud computing environment of FIG. 9, in accordance with an embodiment.

Referring now to FIG. 10, a set of functional abstraction layers 1100 provided by cloud computing environment 1000 has been shown. It should be understood in advance that the components, layers, and functions shown in FIG. 8 may be intended to be illustrative only and embodiments of the invention may be not limited thereto. As depicted, the following layers and corresponding functions may be provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual exclusive networks; virtual applications and operating systems 1128; and virtual clients 1130.

In one example, management layer 1132 may provide the functions described below. Resource provisioning 1134 provides dynamic procurement of computing resources and other resources that may be utilized to perform tasks within the cloud computing environment. Metering and Pricing 1136 provide cost tracking as resources may be utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels may be met. Service Level Agreement (SLA) planning and fulfillment 1142 provide pre-arrangement for, and procurement of, cloud computing resources for which a future requirement may be anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data management 1156.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing computer jobs in a queue comprising:

extracting current metadata from a new job received for processing;

providing the extracted current metadata from said new job to a self-learning artificial intelligence (AI) system for determining when a similar enriched metadata exists in a database, wherein availability of enriched data is determined by researching said database according to labels used to classify contents of said enriched data;

further comprising generating enriched metadata from said extracted current metadata and updating said database;

determining a job score associated with said received new job by said self-learning AI system based on said extracted current metadata and the generated enriched metadata;

determining a storage footprint for said new job based on said extracted current metadata;

determining whether said new job can be grouped and labelled similarly for processing with a plurality of pending jobs disposed on a queue;

analyzing information about job groupings and an overall storage footprint of the plurality of pending jobs disposed on the queue to provide an optimal solution by said self-learning AI system for processing the plurality of pending jobs, wherein said provided optimal solution includes both speed and cost considerations of storage and groupings of said plurality of pending jobs;

adding said new job to said queue and sorting said queue based on said provided optimal solution, wherein the adding of said job to said queue comprises a placement of said new job on said queue is based on a combination of said provided optimal solution, said determined score of the new job, said determined storage footprint, said determined grouping of the new job with the pending jobs disposed on said queue for processing, and said similar enriched metadata;

process said new job and the pending jobs according to the placement of said new job on the queue.

2. The method of claim 1, wherein said queue is updated after sorting and said updated queue is sent to a scheduler for further job processing.

3. The method of claim 2, wherein said job score is determined from at least one of a job priority, previous job completion record, and/or job complexity.

4. The method of claim 1, wherein said similar jobs are also grouped together for processing when said queue is being sorted and updated.

5. The method of claim 4, wherein the queue is also sorted based on a plurality of prefetch and data evict needs of each job.

6. The method of claim 5, wherein said new job is grouped with other jobs on said queue based on prefetch and data evict needs of said jobs in said queue.

7. The method of claim 1, further comprising:

updating and resorting said queue every time one of said jobs on said queue is completed.

8. The method of claim 7, wherein after said job completion, evicting data from said storage and determining whether said new job received may be regrouped based on said data eviction in said queue.

9. The method of claim 8, further comprising determining an order of said new job received in said queue after any job is completed in said queue by re-determining said score associated with said new job as appropriate and said new job's storage footprint.

10. The method of claim 8, wherein said queue is updated and provided to a scheduler for further data and job processing.

11. A computer system, comprising: one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method for managing computer jobs in a queue comprising:

extracting current metadata from a new job received for processing;

providing the extracted current metadata from said new job to a self-learning artificial intelligence (AI) system for determining when a similar enriched metadata exists in a database, wherein availability of enriched data is determined by researching said database according to labels used to classify contents of said enriched data;

further comprising generating enriched metadata from said extracted current metadata and updating said database;

determining a job score associated with said received new job by said self-learning AI system based on said extracted current metadata and the generating enriched metadata;

determining a storage footprint for said received new job based on said extracted current metadata;

determining whether said new job can be grouped and labelled similarly for processing with a plurality of pending jobs disposed on a queue;

analyzing information about job groupings and an overall storage footprint to provide an optimal solution by said self-learning AI system for processing of the plurality of pending jobs disposed on the queue, wherein said optimal solution includes both speed and cost considerations and groupings of said plurality of pending jobs;

adding said new job to said queue and sorting said queue based on said provided optimal solution, wherein the adding of said job to said queue comprises a placement of said new job on said queue is based on a combination of said provided optimal solution and said determined score of the new job, and said determined storage footprint, and said determined grouping of the new job with the pending jobs disposed on said queue for processing and said similar enriched metadata;

process said new job and the pending jobs according to the placement of said new job on the queue.

12. The computer system of claim 11, wherein said queue is updated after sorting and said updated queue is sent to a scheduler for further job processing.

13. The computer system of claim 11, wherein said job score is determined from at least one of a job priority, previous job completion record, and/or job complexity.

14. The computer system of claim 11, wherein said storage footprint is a cache footprint.

15. The computer system of claim 11, wherein said similar jobs are also grouped together for processing when said queue is being sorted and updated.

16. A computer program product, comprising: one or more non-transitory computer-readable storage media and program instructions stored on at least one or more tangible storage media, the program instructions executable by a processor to cause the processor to perform a method comprising:

extracting current metadata from a new job received for processing;

providing the extracted current metadata from said new job to a self-learning artificial intelligence (AI) system for determining when a similar enriched metadata exists in a database, wherein availability of enriched data is determined by researching said database according to labels used to classify contents of said enriched data;

further comprising generating enriched metadata from said extracted current metadata and updating said database;

determining a job score associated with said received new job by said self-learning AI system based on said extracted current metadata and the generated enriched metadata, wherein availability of said enriched data is determined by researching said database according to labels used to classify contents of said enriched data;

further comprising generating enriched metadata from said extracted current metadata and updating said database;

determining a storage footprint for said new job based on said extracted current metadata;

determining whether said new job can be grouped and labelled similarly for processing with a plurality of pending jobs disposed on a queue;

analyzing information about job groupings and an overall storage footprint of the plurality of pending jobs disposed on the queue to provide an optimal solution by said self-learning AI system for processing the plurality of pending jobs, wherein provided said optimal solution includes both speed and cost considerations of storage and groupings of said plurality of pending jobs;

adding said new job to said queue and sorting said queue based on said provided optimal solution, wherein the adding of said job to said queue comprises a placement of said new job on said queue is based on a combination of said provided optimal solution, said determined score of the new job, said determined storage footprint, and said determined grouping of the new job with the pending jobs disposed on said queue for processing, and said similar enriched metadata;

process said new job and the pending jobs according to the placement of said new job on the queue.

17. The computer program product of claim 16, wherein said queue is updated after sorting and said updated queue is sent to a scheduler for further job processing.

18. The computer program product of claim 16, wherein said job score is determined from at least one of a job priority, previous job completion record, and/or job complexity.

19. The computer program product of claim 16, wherein said storage footprint is a cache footprint.

\* \* \* \* \*